Oct. 13, 1931.  R. F. HILL  1,826,883
SAFETY HOOK-OFF
Filed March 29, 1930
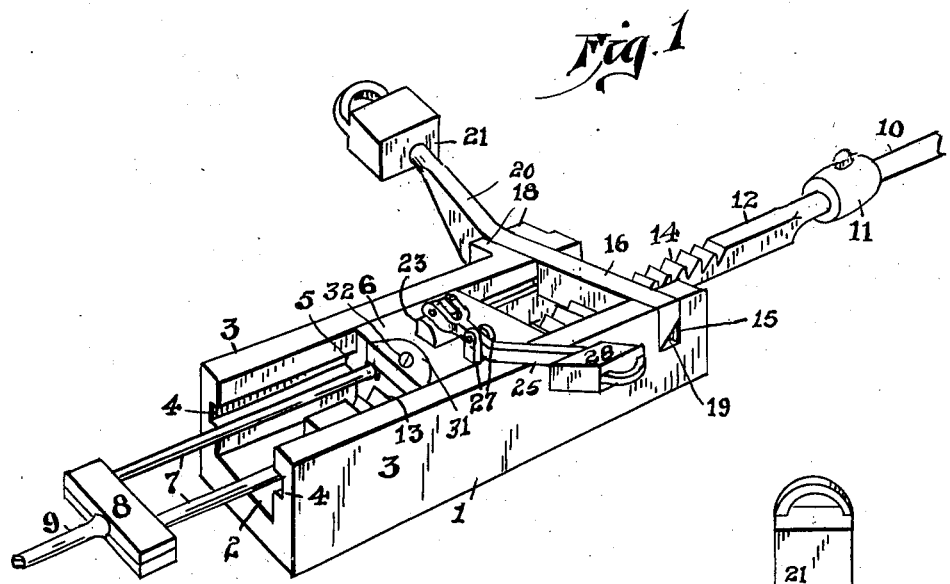
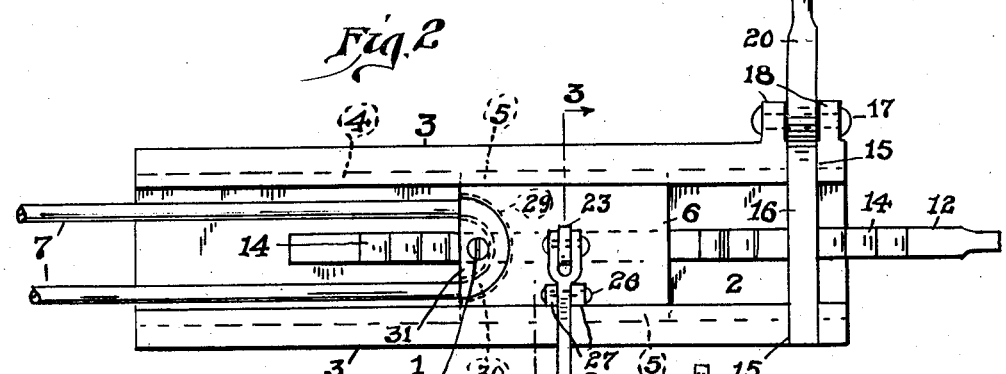
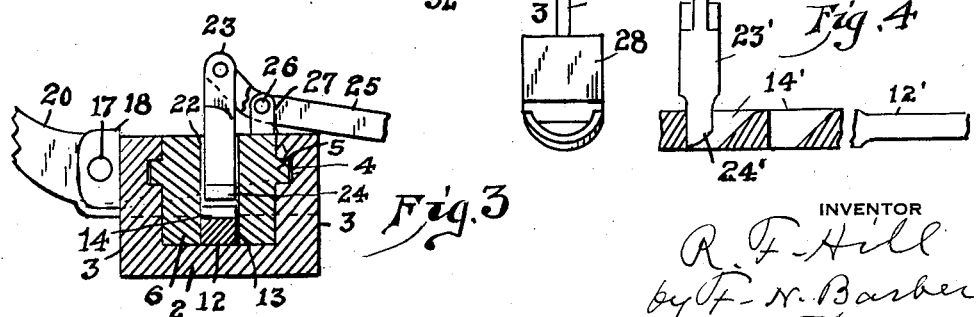
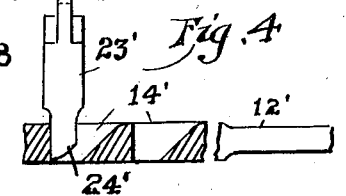
INVENTOR
R. F. Hill
by F. N. Barber
attorney Patented Oct. 13, 1931

1,826,883

UNITED STATES PATENT OFFICE

ROWLAND F. HILL, OF TOLEDO, OHIO

SAFETY HOOK-OFF

Application filed March 29, 1930. Serial No. 440,137.

My invention relates to safety hook-offs or devices for detachably connecting pumping powers to pumping jacks at wells near the pumping power.

It is the object of this invention to provide an improved hook-off having two latches, one to connect the rod connected with the pumping power to the rod connected with the pumping jack, and the other to hold the rod connected to the pumping jack in a definite position when the other latch is disconnected.

Referring to the accompanying drawings, Fig. 1 is a perspective view of my improved safety hook-off with the pull-rod and power connections broken off; Fig. 2, a plan view of Fig. 1; and Fig. 3, a section on the line 3—3 on Fig. 2. Fig. 4 is a section of a modified ratchet bar and pawl cooperating therewith, the bar being in longitudinal section, some parts being in elevation and other parts being broken away.

On the drawings 1 is a horizontal base member having the bottom 2 and the two upstanding parallel sides 3. The opposing faces of the sides 3 are provided with horizontal parallel grooves 4 to receive the lateral guide ribs 5 on the sides of the cross-head 6 which is reciprocable horizontaly between the sides 3. The cross-head carries one end of the two parallel rods 7 whose other end is attached to the cross-bar 8. 9 is a rod connecting the cross-bar 8 to suitable power mechanism such as a rotary pumping power. The parts 7, 8, and 9 constitute a power connection with the cross-head 6.

10 is a rod for connection to a pump through suitable mechanism such as a pumping jack. This rod 10 is connected by the coupling 11 to the ratchet bar 12 reciprocable through the opening 13 in the cross-head 6. The ratchet bar preferably slides upon the bottom 2 of the base member 1, its ratchet teeth 14 projecting upwardly. The bar 12 is parallel with the sides 3 of the member 1.

The parts 10, 11, and 12 constitute a pull-rod connection with a pumping jack.

The sides 3 of the base member 1 has upwardly open opposite slots 15 to receive the pawl 16 pivoted on the pin 17 carried by the ears 18 projecting from one of the sides 3. The lower edge of the pawl has a bevelled tooth 19 for engagement with the teeth 14. The teeth 14 and 19 are bevelled so as to prevent the pull-rod connection from moving to the right when the pawl is engaged with the teeth 14.

The pawl 16 is provided with the arm 20 which carries the weight 21, the latter causing the pawl 16 to be disconnected from the bar 12 when the friction between the teeth 14 and 19 is sufficiently reduced from that due to the pull to the right on the pull-rod connection.

The cross-head 6 has a vertical opening 22 to receive the reciprocating pawl 23 whose lower end has a tooth 24 for engagement with a tooth 14. The pawl has pivotally connected thereto a lever 25 carried by the pivot pin 26 in the ears 27 on the top of the cross-head. The outer and longer end of the lever 25 carries the weight 28.

When the pawl 23 is connected to the ratchet bar 12 and the pawl 16 is disconnected therefrom, the pumping power is operatively connected to the pumping jack so that when the power connection moved to the left the pull-rod connection is also moved to the left and operates the pumping jack and the pump connected thereto. If it is desired to stop the operation of the pull-rod connection it is merely necessary to lower the pawl 16 so that its tooth 19 is interlocked with one of the teeth 14 when the pull-rod connection is about at the left hand limit of its stroke. This prevents further travel of the ratchet bar 12 to the right while the cross-head 6 is still moved toward the right. The friction between the pawl and the corresponding tooth 14 is thus reduced so that the weight 28 automatically causes the pawl 22 to be pulled up above the teeth 14. The power connection continues to reciprocate the cross-head without any effect on the pull-rod connection.

When it is desired to re-connect the pull-rod and power connections it is only necessary to lower the pawl 23 into engagement with one of the teeth 14 when the cross-head is at about the limit of its right hand stroke. On the next left-hand stroke of the cross-head 6 the pull-rod connection will be moved to the left, causing the friction between the teeth 15 and the corresponding tooth 14 to be relieved. Thereupon the weight 21 moves the pawl 16 above the upper edge of the teeth 14.

The parallel rods 7 are made continuous through their connection with the cross-head 6. The cross-head has a semi-circular groove 29 which receives the semi-circular connection 30 forming the inner ends of the rods 7. By this arrangement the rods 7 together with the parts 8 and 9 may have slight pivotal movement with respect to the cross-head 6. The groove 29 and the connection 30 are covered by the semi-circular plate 31 secured in place by the screw 32.

On Fig. 4, I have shown a modified ratchet bar 12' having slots 14' with beveled ends in place of the teeth 14 on Fig. 1 with their beveled sides for positively pushing the pawl up above the bar in case the weight does not automatically actuate the pawl upon the relieving of the friction between the pawl and one of the teeth. It is quite necessary that the pawl shall be entirely above the teeth when the cross-head is moved to the left and it is not desired to operate the bar 12. The bevels on the teeth 14 act similarly to force the pawl 16 up above the top of the teeth in case the weight 21 does not operate the lever 20 quickly enough.

I claim:

1. In a safety hook-off for a pump, a base member, a cross-head reciprocably supported and guided thereby, a power connection, a pull-rod connection, means connecting the power connection to the cross-head, teeth on the pull-rod connection a pawl carried by the cross-head and adapted to be held in locking engagement with a tooth on the pull-rod connection by friction between the tooth and the pawl when power is applied to the power connection, means to automatically release the pawl from the said tooth when the said friction is relieved, a pawl carried by the base member and adapted to be held in locking engagement with a tooth on the pull-rod connection by friction between the latter tooth and the latter pawl when power is released from the power connection, and means to automatically release the latter pawl when power is applied to the power connection.

2. In a safety hook-off for a pump, a base member, a cross-head reciprocably supported and guided thereby, a power connection, a pull-rod connection, means pivotally connecting the power connection to the cross-head, teeth on the pull-rod connection, a pawl carried by the cross-head and adapted to be held in locking engagement with a tooth on the pull-rod connection by friction between the tooth and the pawl when power is applied to the power connection, means to automatically release the pawl from the said tooth when the said friction is relieved, a pawl carried by the base member and adapted to be held in locking engagement with a tooth on said pull-rod connection by friction between the latter tooth and the latter pawl when power is released from the power connection, and means to automatically release the latter pawl when power is applied to the power connection.

3. In a safety hook-off for a pump, a base member, a cross-head reciprocably supported and guided thereby, a power connection, a pull-rod connection, means connecting the power connection to the cross-head, teeth on the pull-rod connection, a pawl carried by the cross-head, a pawl carried by the base member, the first pawl being adapted to interlock frictionally with the said teeth when power is applied to the power connection and the second pawl being adapted to interlock frictionally with the said teeth when power is released from the power connection, and means to automatically release the latter pawl when power is applied to the power connection.

4. In a safety hook-off for a pump, a horizontal base member having vertical parallel sides which contain in their opposing faces horizontal grooves, a horizontally-traveling cross-head positioned between the sides and having ribs guided in the grooves, a power connection, a pull-rod connection, means connecting the power connection to the cross-head, teeth on the pull-rod connection, a pawl carried by the cross-head and adapted to be held in locking engagement with a tooth on the pull-rod connection by friction between the tooth and the pawl when power is applied to the power connection, means to automatically release the pawl from the said tooth when the said friction is relieved, a pawl carried by the base member and adapted to be held in locking engagement with a tooth on said pull-rod connection by friction between the latter tooth and the latter pawl when power is released from the power connection, and means to automatically release the latter pawl when power is applied from the power connection.

5. In a safety hook-off for a pump, a horizontal base member having vertical parallel sides which contain in their opposing faces horizontal grooves, a horizontally-traveling cross-head positioned between the sides and having ribs guided into the grooves, a power connection, a pull-rod connection, means connecting the power connection to the cross-head, teeth on the pull-rod connection, a pawl carried by the cross-head, a pawl carried by the base member, the first pawl being adapted to interlock frictionally with the said teeth when power is applied to the power connection and the second pawl being adapted to interlock frictionally with the said teeth when power is released from the power connection, and means to automatically release the latter pawl when power is applied to the power connection.

In testimony whereof I affix my signature.

ROWLAND F. HILL.